United States Patent
Fischer et al.

(10) Patent No.: US 6,224,017 B1
(45) Date of Patent: May 1, 2001

(54) BRAKE FOR A LIFT FLAP ADJUSTMENT MECHANISM

(75) Inventors: Manfred Fischer, Uhldingen-Mühlhofen; Bernard Hunold, Weidenring; Karl Zimmermann, Steinacker, all of (DE)

(73) Assignee: Liebherr-Aerospace Lindenberg GmbH, Lindenberg/Allgau (DE)

( * ) Notice: Subject to any disclaimer, the term of this patent is extended or adjusted under 35 U.S.C. 154(b) by 0 days.

(21) Appl. No.: 09/445,506

(22) PCT Filed: Jun. 3, 1998

(86) PCT No.: PCT/EP98/03322

§ 371 Date: Apr. 28, 2000

§ 102(e) Date: Apr. 28, 2000

(87) PCT Pub. No.: WO98/56655

PCT Pub. Date: Dec. 17, 1998

(30) Foreign Application Priority Data

Jun. 9, 1997 (DE) .............................................. 197 24 117

(51) Int. Cl.[7] .................................................. B64C 13/00
(52) U.S. Cl. ........................ 244/75 R; 244/213; 188/134

(58) Field of Search .................................. 244/111, 75 R, 244/213, 203; 188/134, 106 R, 71.6, 72.6, 1.11 R, 1.11 W; 192/8 R

(56) References Cited

U.S. PATENT DOCUMENTS

| 3,596,740 | * | 8/1971 | Nau ........................................ 188/134 |
| 3,802,281 | * | 4/1974 | Clarke . |
| 4,030,578 | * | 6/1977 | Cacciola et al. ....................... 188/134 |
| 4,845,468 | * | 7/1989 | Stark ................................ 188/1.11 R |
| 5,299,666 | * | 4/1994 | Lang et al. ............................ 188/134 |
| 5,330,034 | * | 7/1994 | Rancourt et al. .................... 188/71.6 |
| 5,585,166 | * | 12/1996 | Kearsey ............................ 188/106 R |
| 5,909,171 | * | 6/1999 | Kyrtsos ........................... 188/1.11 W |

* cited by examiner

Primary Examiner—Galen L. Barefoot
(74) Attorney, Agent, or Firm—Jagtiani & Associates

(57) ABSTRACT

A brake for a flap adjusting mechanism and a method for condition monitoring are proposed. The brake has one or more temperature sensors (30). In the method for condition monitoring, the temperature signal is compared with a desired temperature (T1, T2) in the signal processing unit in a time period during or after a rotation of the driveshaft (2) in the housing (4) while expending the braking moment. An error signal is produced in case of deviations of the temperature signal from the desired temperature.

17 Claims, 2 Drawing Sheets

BRAKE FOR A LIFT FLAP ADJUSTMENT MECHANISM

The present invention relates to a brake in particular for a flap adjusting mechanism and to a method for condition monitoring of the brake.

Such brakes are used in commercial airplanes to increase passive safe in case of defects in the flap adjusting mechanism or its drive.

In the landing approach the lift of the wings is essentially increased by extendible lift flaps or slats, permitting lower flying speeds. These flaps are normally extended symmetrically on the left and right against the effect of aerodynamic forces. One drive system is provided for each wing.

In case of disturbances in one of the drive systems—for example through shaft failure due to overloading or material fatigue—it could happen that the extended flaps of one wing are moved by the aerodynamic forces back into their stowed position. The lift of the two wings would be asymmetrical so that a critical rolling, motion of the airplane would be initiated.

In order to avoid this state modern commercial airplanes are equipped with a sensor for detecting asymmetry of the two wings and triggering an activation of hydraulically operated brakes. The brakes then prevent further motion of the flaps through aerodynamic forces so that altogether only little asymmetry can arise and the airplane can land safely.

In is known system the monitoring of asymmetry and the hydraulic activation are very elaborate and trouble-prone due to their high complexity. For safety reasons the hydraulic activation is executed redundantly with at least two separate hydraulic systems. The measuring and control signals are all monitored constantly in a central control computer. The great number of signals to be processed by the control computer, which are also produced in other peripheral devices, results in very high complexity of the total control system.

Passively acting brakes are also known for this purpose. They have a housing and a driveshaft motively connected with the flaps which is mounted in the housing so as to be freely rotatable in one direction of rotation and only rotatable in the other direction of rotation by overcoming a certain braking moment. The braking moment is produced by a spring-biased disk assembly. A freewheel is disposed in the torque flow between housing and driveshaft, thereby achieving the free rotatability in one direction.

This brake system exploits the fact that the aerodynamic forces on the flaps at ways act in the "stow" direction. The brake is so installed that the driveshaft motively connected with the brake is freely rotatable for flap adjustment upon extension of the flaps. Upon extension the flap adjustment drive must thus overcome substantially only the aerodynamic forces, When stowing the flaps, which is normally only done after touchdown, the drive must overcome substantially only the braking moment. In case of a defect in the drive of the flap adjusting mechanism, the brake pre vents stowing of the particular flap so as to avoid the critical asymetrical flight condition. The braking moment produced by spring bias on the disk assembly is somewhat greater than the maximum restoring forces from the aerodynamic load on the flap.

The advantages of this system are that it relieves the central control computer of constantly monitoring the system and activating the hydraulic brakes, and omits the hydraulic brakes with their elaborate activation by means of redundantly provided hydraulic lines.

The disadvantage of this system is that it is hardly possible to check operability in the installed state. In particular it is difficult to make statements about whether braking moment is within the permissible range or whether the brake contains the stipulated amount of lubricant. It is desirable to be able to check the operability of the brakes reliably and in a simple way in every flight cycle.

One conceivable way of making a statement about the amount of the braking moment is to measure the current consumption of the drive motor for flap adjustment. However, the result of such a measurement can be considerably falsified by friction in the transmission path between the drive motor and the brake.

Monitoring braking moment by measuring the reaction moment on a spring housing suspension could have an uncontrollable influence on the dynamics of the system.

The problem of the invention is to provide a reliable, passively acting brake in particular for a flap adjusting mechanism whose functional state can be checked in the installed state simply and with a high confidence level. Furthermore, a method is to be provided for condition monitoring of the inventive brake.

This problem is solved by a brake with the features of the main claim. Advantageous developments of the invention are given by the dependent claims.

The temperature sensor or sensors disposed at suitable places on the brake permit monitoring of temperature(s) at the measuring points.

In a normal flight cycle the flaps are extended completely before landing d stowed again completely after touchdown. The full adjusting path corresponds to a certain number of rotations or total rotation angle on the flap adjusting mechanism driveshaft coupled motively with the brake. The amount of desired braking moment which must be overcome for stowing the flaps is likewise known. The amount of frictional work produced when stowing the flaps is equal to the time integral of frictional power during the process. At constant braking moment frictional work is calculated from the product of braking moment and total rotation angle. This friction work leads to a characteristic temperature increase in the brake which can be determined by the temperature sensor or sensors.

If there is a functional disturbance of the brake so that braking moment deviates from desired braking moment, this can be detected with reference to the determined temperature. If braking moment is too small, for example due to a defect of spring elements or wear on friction linings, the temperature increase is smaller than otherwise. If there is too little lubricant in the brake for example, braking moment is greater due to a lack of lubrication on the friction elements and the heat capacity of the brake is also smaller. In this case the temperature increase will be greater.

In order to increase safety further, or obtain data on the temperature distribution in the brake, it is possible to provide a plurality of temperature sensors in the brake. Suitable places are for example in the lubricant area of the brake where a good temperature balance is given, or in the area of friction elements where the influences of heat dissipation to the surroundings are lowest.

Suitable temperature sensors are for example semiconductor thermal elements which have high reliability. However, one can also determine temperature indirectly using expansion sensors fastened to a component exposed to the temperature increase and thereby expanding.

In an advantageous development of the invention, a rotation signal sensor is furthermore provided for measuring the total rotation angle. This sensor permit the brake to be monitored even when the flaps are stowed out of any intermediate position. The lower desired temperature increase results from the accordingly smaller total rotation angle.

The rotation signal sensor can be executed for example as an inductive impulse transmitter. A suitable pitch sequence on the teeth of a transmitter wheel also makes it possible to recognize the direction of rotation, which can be used advantageously for an evaluation algorithm.

If a signal processing unit with an evaluation logic is provided in or on the brake, the central control computer does not need to constantly process the sensor signals otherwise passed thereto and is thereby relieved. The evaluation logic performs the comparison of actual temperature increase during or after stowing of the flaps with a desired temperature increase which is preset or determined from the signal of the rotation signal sensor. An error signal is only conveyed to the central control computer if the temperature increase is outside expected limits.

It is advantageous to dispose a freewheel motively between housing and driveshaft in the brake in the way known in the art. Braking moment then only becomes effective when extending the flaps. When extending the flaps only the aerodynamic forces must thus be overcome, The drive and the structure are thus subjected to less load than if braking moment also had to be overcome upon extension, and can therefore be of lighter design.

To transmit braking moment between housing and driveshaft it is advantageous to use a likewise fundamentally known biased disk assembly. The plurality of friction surfaces permits relatively high torque to be transmitted within a small space, while achieving a largely uniform heat distribution. Lining one of each pair of friction surfaces with a special paper lining is a tried and reliable method for achieving high, well reproducible coefficients of friction. With a suitable choice of friction linings and lubricant one obtains a favorable ratio of coefficient of adhesion to coefficient of sliding friction so as to avoid a jerky breakaway of the brake.

For applying a substantially constant bias it is especially suitable to use an elastic spring element disposed in the power flow between housing and at least one outer disk of the disk assembly. Depending on the constructional design it may be advantageous to provide intermediate members such as a pressure plate between spring element and housing or spring element and outer disk.

One achieves very high reliability by disposing a plurality of parallel acting spring elements formed as coil springs with axial bias in the power flow between housing and an outer disk of the disk assembly. It is advantageous if the coil spring are distributed uniformly on the disk assembly face shaped like a ring disk. This achieves uniform pressure so as to avoid harmful temperature peaks. If a coil spring fails the braking moment is only smaller by the share this one coil spring had on the total bias. One can of course also use other spring elements, however. For example, disk springs have the advantage that they are very short axially.

One achieves genuine redundancy by disposing spring elements of the same kind on each side of the disk assembly and limiting the axial slidability of the disk assembly on each side by a stop fixed on the housing. In normal operation the disk assembly is held between the spring elements on both sides. If spring elements fail on one side, the spring power is lower on that side so that the disk assembly will give way to hiss side. However, if a stop fixed on the housing is provided to limit axial slidability, the disk assembly is in this case clamped between the stop and the intact spring elements of the other. Assuming low axial play between disk assembly and stop, the spring elements can spread only a small amount so that virtually He fill biasing force is retained.

The use of "semifluid" as a lubricant is advantageous with respect to lubricant distribution in the housing and corrosion protection.

The invention will be explained in more detail in the following with reference to the enclosed drawings.

Figure 1:
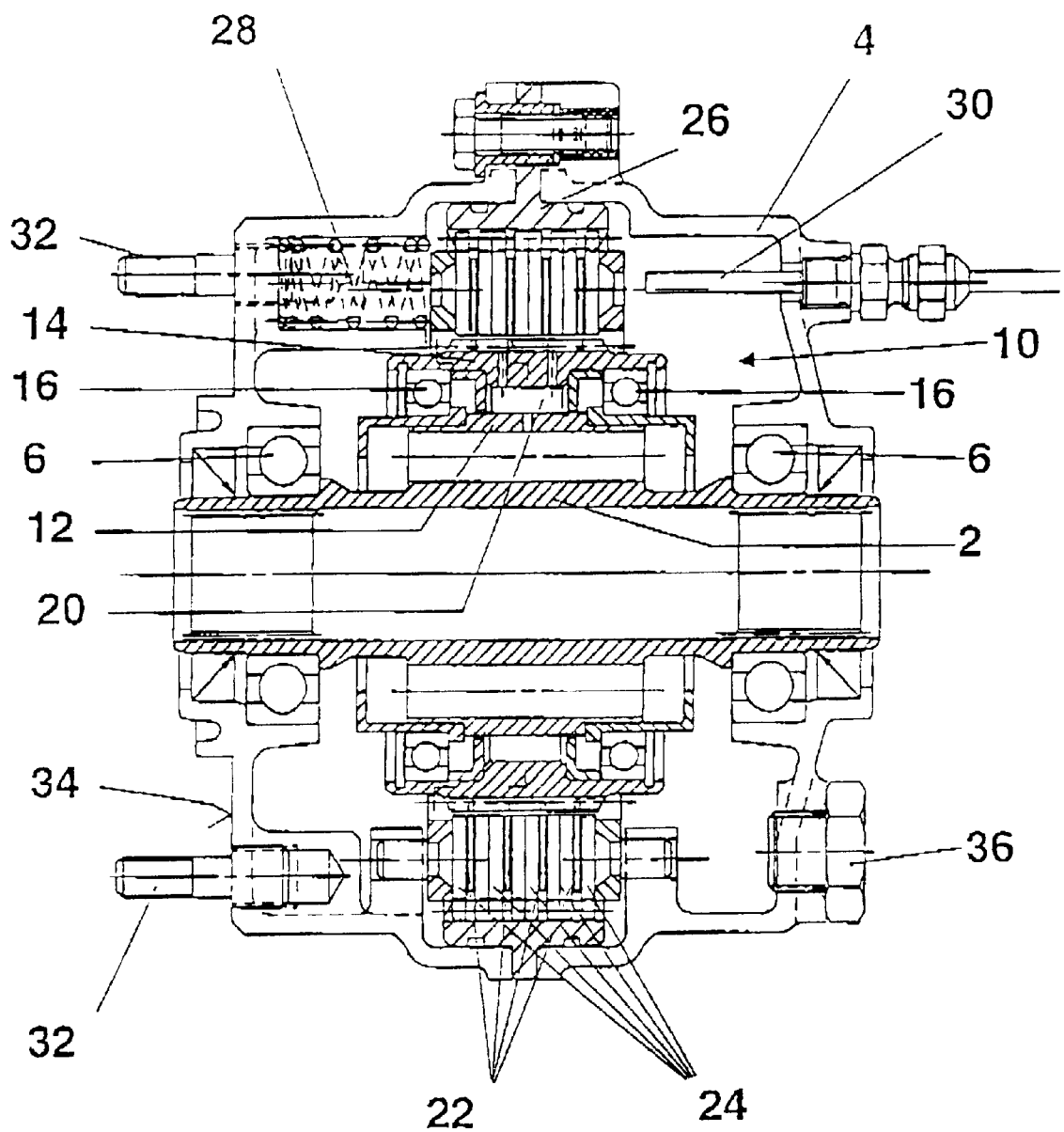
FIG. 1 shows a longitudinal section through an inventive brake.

In the inventive brake shown in FIG. 1 driveshaft 2 is pivotally mounted in housing 4 by means of ball bearings 6. Driveshaft 2 is formed as a hollow shaft. It has shape-mated toothing on the inside of its outer ends for motive connection to the shaft or shafts to be braked. In freewheel clutch 10 inside ring 12 is connected with driveshaft 2 so as to rotate in unison. Outside ring 14 is mounted on inside ring 12 by bearings 16 to as to rotate in one direction of rotation. Between inside ring 12 and outside ring 14 there are clamping bodies 20 which permit rotation of the outside ring in only one direction relative to the inside ring. Friction disks 22 are disposed on outside ring 14 so as to be axially slidable and rotate in unison. Friction disks 22 are preferably provided with a paper lining, thereby achieving a high coefficient of friction and a favorable ratio of adhesion to sliding friction. Each friction disk 22 is disposed between a pair of friction disks 24 preferably executed as steel disks. The latter are in turn disposed in disk carrier 26 so as to rotate in unison and with axial play. The disk canter is connected firmly with housing 4. Circumferentially distributed coil springs 28, only one of which is shown in the sectional drawing, are held in specially provided receiving means in the housing. The axial bias of springs 28 acts on disk assembly 22, 24 and determines the amount of transmittable braking moment.

In an embodiment in which spring elements are only disposed on one side of the disk assembly, the opposite outer one of disks 24 is supported axially by a stop in disk carrier 26.

In housing 4 there is an axial space on each side of the disk assembly for receiving spring elements so as to also permit a redundant spring assembly one each side of the disk assembly. In this embodiment the axial play of the outer one of disks 24 in disk carrier 26 is limited outwardly. As long as the spring elements on each side of the disk assembly produce the same axial force, the disk assembly is held axially between said spring elements. If a spring element fails on the right side of the disk assembly for example, the right outer one of disks 24 will come to lie against the specially provided stop in disk carrier 26 The spring elements on the left side of the disk assembly are thereby extended only slightly, so that the full bias in the disk assembly is virtually retained. The full braking moment is still transmittable.

In the shown embodiment there is one temperature sensor 30 which pro des into the interior of housing 4. The measuring line connected thereto leads to the signal processing unit (not shown). To increase safety it is advantageous to provide a plurality of temperature sensors.

The temperature signal is processed in the central control computer or, in an advantageous development of the invention, in a distributed signal processing unit disposed close to the brake. The signal processing unit can be a distributed computer with a microprocessor or for example a simple electronic logic circuit.

Bolts 32 and flat surface 34 serve to fasten the brake to the airplane structure. Through sealed screw plug 36 the interior of the brake is accessible for example for pouring in lubricant. An especially suitable lubricant is "semifuid" by reason of its good lubricant and anticorrosive properties.

Temperature sensor 30 in the housing of the passively acting brake permit simple and reliable checking of the functional condition of the brake.

Figure 2:
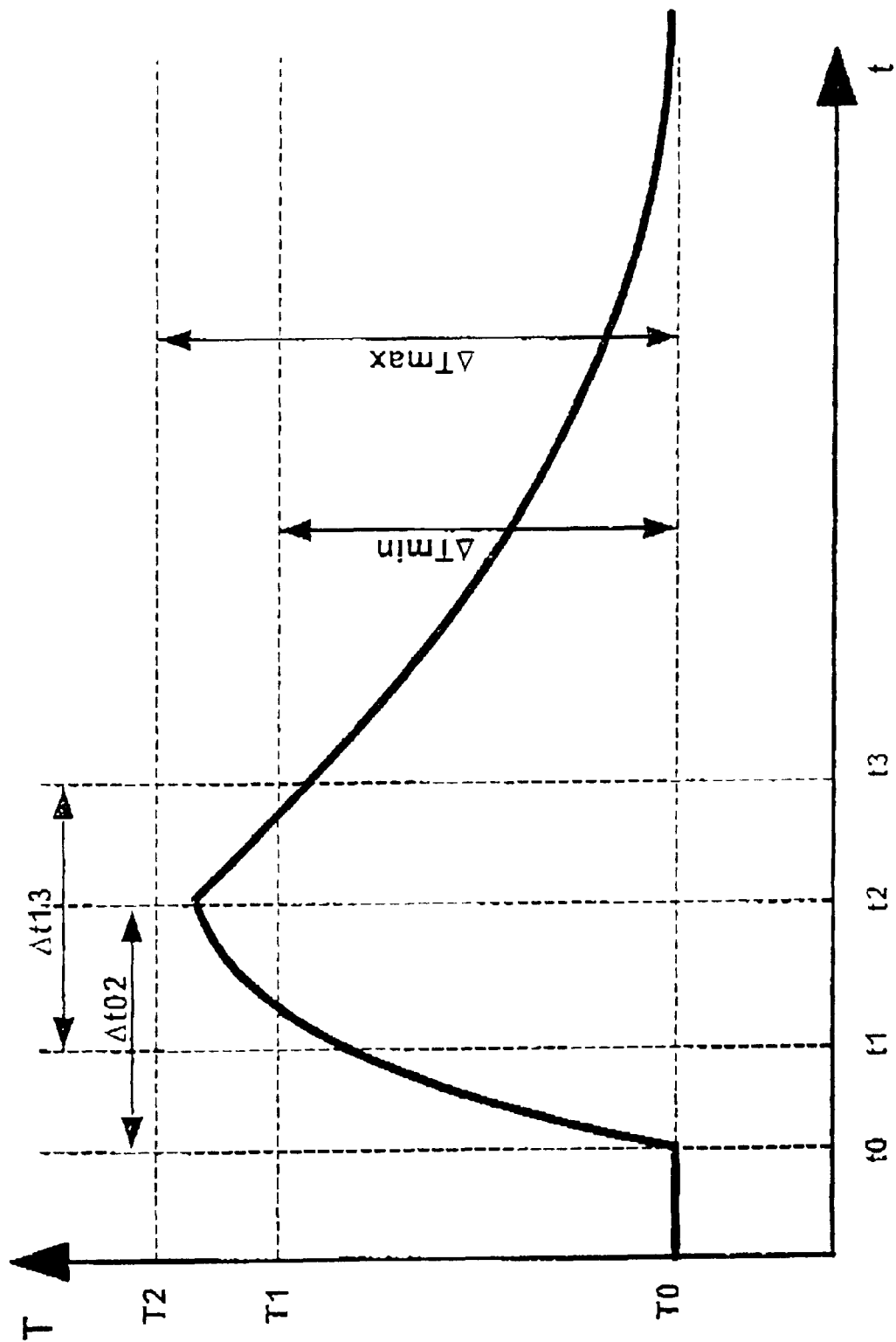
FIG. 2 shows by way of example a typical march of temperature on the temperature sensor.

FIG. 2 shows schematically a march of temperature plotted over time, as can be measured during and after a rotation of the driveshaft in the housing while expending braking moment in the brake. It is assumed that the temperature sensor is disposed very close to the disk assembly so that no essential delay times occur. In the drawing temperatures are designated T and times t.

The adjusting process, which can last 20 seconds for example, takes place time interval $\Delta t02$. Temperature T0 prevails at the onset of the adjusting process. During the adjusting process heat is generated on the friction surfaces in the disk assembly so that temperature rises. At the end of the adjusting process (or shortly thereafter) at time t2, maximum temperature is reached at the measuring point. Temperature decreases slowly again after time t2; heat is emitted to the surroundings.

In the signal processing unit, lower limit $\Delta Tmin$ and upper limit $\Delta Tmax$ for temperature increase are stored as desired temperatures. These Limits can be either firmly preset or determined from the signal of a rotation sensor and the known desired braking moment. The amount of temperature increase can be 50 kelvins for example. Starting out from initial temperature T0 one obtains lower temperature limit T1 and upper temperature limit T2 as T1=T0+$\Delta$Tmin T2=T0+$\Delta$Tmax where $\Delta Tmin$ can be 40 kelvins and $\Delta Tmax$ 60 kelvins for example.

In measuring Interval $\Delta t13$ the measured temperature is compared with temperatures T1 and T2. If temperature T1 is not reached during the measuring interval (e.g. in case of defective spring elements) or if temperature T2 is exceeded (e.g. due to lack of lubrication) there is an error in the brake. The signal processing unit produces an error signal which is transmitted to the central control computer. Otherwise no signal is produced; the central control computer is not burdened by processing signal.

This method of condition monitoring is simple and already offers a high confidence level for data on the condition of the brake.

More sophisticated evaluation algorithms are of course also possible. One can gain more information on the condition of the brake for example by taking different measuring points into account. By comparing the signals from different temperature sensors one can also detect a defective sensor for example, which might be reported to the central control computer by an error signal.

If the march of temperature in time (heating and cooling phases) is actually compared with a desired march of temperature, further statements can be made on the condition of the brake.

Reference Signs

2 Driveshaft
4 Housing
6 Bearings
10 Freewheel clutch
12 Inside ring
14 Outside ring
16 Bearings
20 Clamping bodies
22 Friction disks
24 Friction disks
26 Disk carrier
28 Coil screw
30 Temperature sensor
32 Bolts
34 Surface
36 Screw plug

What is claimed is:

1. A brake for a flap adjusting mechanism having:
   a fixed housing;
   a driveable drive shaft rotatable so as to expend a braking moment;
   a sensor for determining a temperature in said brake; and
   a signal processing unit with an evaluation logic for evaluating at least a signal from said temperature sensor being provided;
   characterized in that a functional disturbance of said brake is detected with reference to a deviation of said temperature sensor signal from a desired temperature.

2. A brake according to claim 1, characterized in that a rotation signal sensor is provided on said driveshaft.

3. A brake according to claim 1, characterized in that said signal processing unit is disposed in a distributed fashion along said brake for relieving a central control computer.

4. A brake according to claim 1, characterized in that a freewheel is disposed motively between said fixed housing and said driveshaft so that said braking moment is only transmittable with respect to one direction of rotation of said driveshaft.

5. A brake according to claim 1, characterized in that an axially biased disk assembly with a plurality of partly paper-lined friction disks shaped like annular disks is provided for transmitting said braking moment between said fixed housing and said driveshaft, said disks being connected alternately in axial succession with said fixed housing and said driveshaft so as to be axially slidable and rotate in unison.

6. A brake according to claim 5, characterized in that at least one spring element is provided in the power flow between said fixed housing and at least one outer disk of said disk assembly for applying a substantially constant axial bias in said disk assembly.

7. A brake according to claim 6, characterized in that a plurality of parallel acting spring elements formed as coil springs are disposed with axial bias in the power flow between said fixed housing and an outer disk of said disk assembly.

8. A brake according to claim 7, characterized in that at least one spring element and one stop fixed on said fixed housing for limiting axial slidability of other disks of said disk assembly are provided on each side of said disk assembly.

9. A brake according to claim 1, characterized in that said fixed housing is filled with "setifluid" as a lubricant.

10. A brake according to claim 2, characterized in that said signal processing unit is disposed in a distributed fashion along said brake for relieving a central control computer.

11. A brake according to claim 2, characterized in that a freewheel is disposed motively between said fixed housing and said driveshaft so that said braking moment is only transmittable with respect to one direction of rotation of said driveshaft.

12. A brake according to claim 3, characterized in that a freewheel is disposed motively between said fixed housing and said driveshaft so that said braking moment is only transmittable with respect to one direction of rotation of said driveshaft.

13. A brake according to claim 2, characterized in that an axially biased disk assembly with a plurality of partly paper-lined friction disks shaped like annular disks is provided for transmitting said braking moment between said fixed ho sing and said driveshaft, said disks being connected alternately in axial succession with said fixed housing and said driveshaft so as to be axially slidable and rotate in unison.

14. A brake according to claim 3, characterized in that an axially biased disk assembly with a plurality of partly paper-lined friction disks shaped like annular disks is provided for transmitting said braking moment between said fixed housing and said driveshaft, said disks being connected alternately in axial succession with said fixed housing and said driveshaft so as to be axially slidable and rotate in unison.

15. A brake according to claim 4, characterized in that an axially biased disk assembly with a plurality of partly paper-lined friction disks shaped like annular disks is provided for transmitting said braking moment between said fixed housing and said driveshaft, said disks being connected alternately in axial succession with said fixed housing and said driveshaft so as to be axially slidable and rotate in unison.

16. A method for condition monitoring of a brake said brake comprising a fixed housing; a driveable drive shaft rotatable so as to expend a braking moment; a sensor for determining a temperature in said brake; and a signal processing unit with an evaluation logic for evaluating at least a signal from said temperature sensor, wherein said method comprises the steps of:

comparing said temperature signal with a desired temperature in said signal processing unit in a time period during or after a rotation of said driveshaft in said fixed housing while expending a braking moment, and producing an error signal case of deviations from said desired temperature.

17. A method according to claim 16, characterized in that said desired temperature is determined from a signal of a rotation sensor and a presettable desired braking moment.

* * * * *